UNITED STATES PATENT OFFICE.

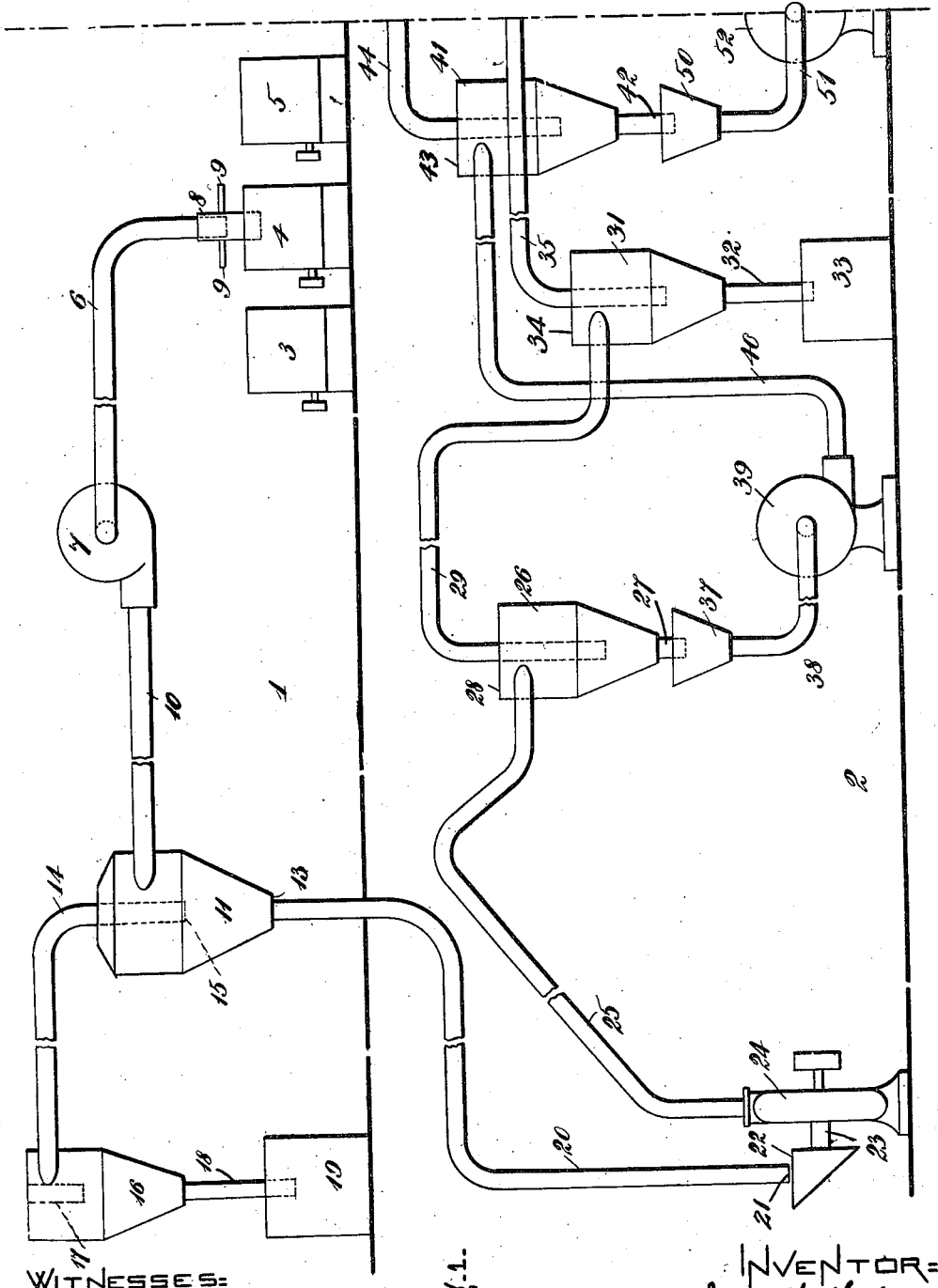

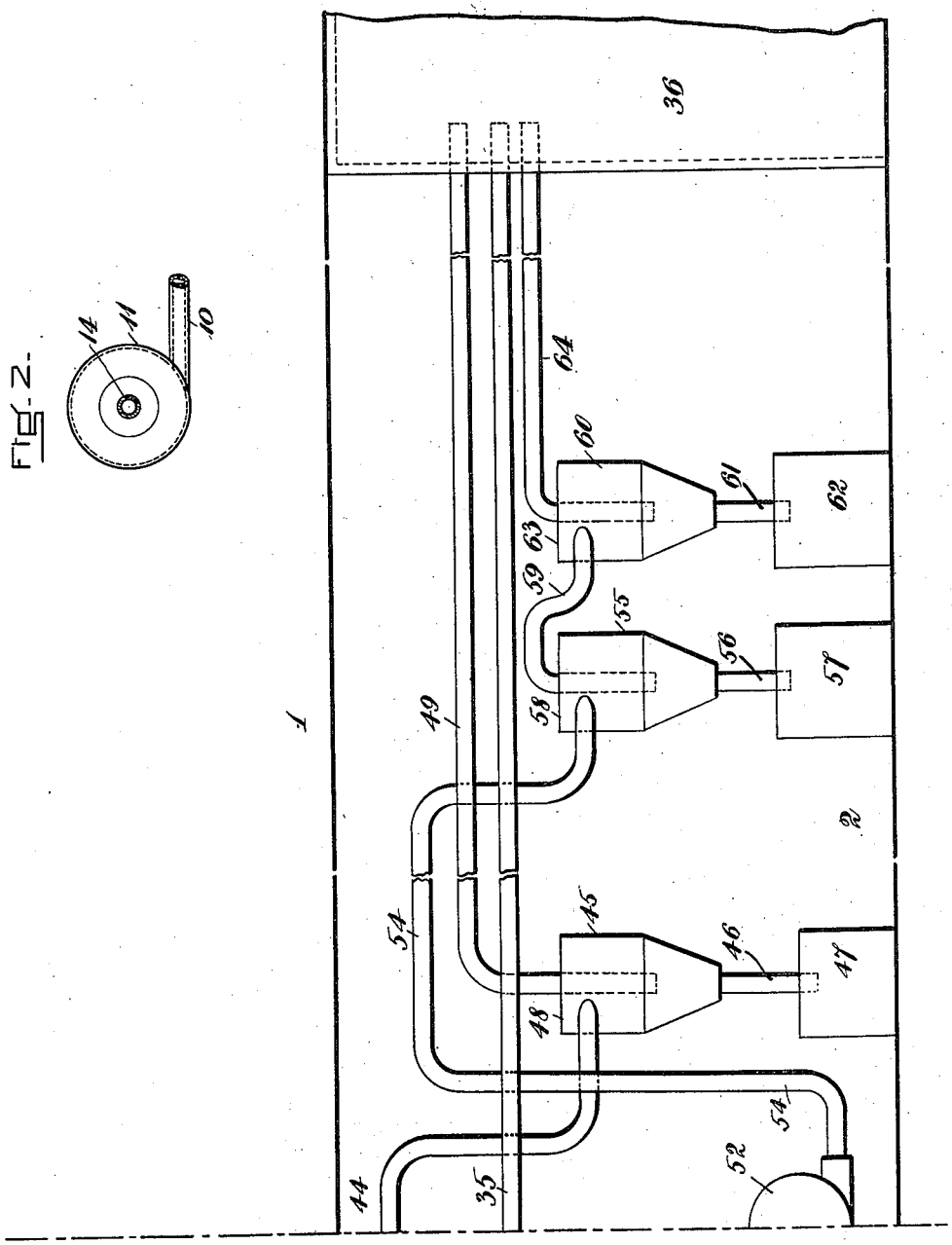

JOHN WALKER, OF BOSTON, MASSACHUSETTS, ASSIGNOR TO MASSACHUSETTS CHOCOLATE COMPANY, OF BOSTON, MASSACHUSETTS, A CORPORATION OF MASSACHUSETTS.

PROCESS OF TREATING COCOA.

1,167,956.  Specification of Letters Patent.  Patented Jan. 11, 1916.

Application filed May 16, 1914. Serial No. 839,180.

*To all whom it may concern:*

Be it known that I, JOHN WALKER, of Boston, in the county of Suffolk and State of Massachusetts, a citizen of the United States, have invented a new and useful Process of Treating Cocoa, of which the following is a full, clear, and exact description, reference being had to the accompanying drawings, forming a part of this specification, in explaining its nature.

My invention relates to a process of treating cocoa for making cocoa powder.

The object of my invention can best be understood by first briefly describing the process that is ordinarily employed for making cocoa powder, the essential steps of which are as follows: The cake cocoa is first broken up as finely as possible by machines adapted for such purpose and by "cake cocoa" is meant the product which is obtained by roasting the cocoa bean, removing its shell, grinding the bean and extracting the oil. The breaking up machines operate also to heat the cocoa for the purpose of imparting color to it, for it will be understood that the color is imparted to the cocoa first by heating it and then preserving the color by an application of cold. Such application of cold is obtained by spreading the heated cocoa on tables in a cool room where the mass is agitated and thus subjected gradually to the cooling influence of air which tends to set the color. This, however, is a somewhat slow and tedious process and is only partially successful inasmuch as some of the cocoa may be properly cooled and the initial rich color preserved, while other portions thereof may have a very poor color or have lost the initial rich color obtained by heating. The reason for this I have found is that the cocoa when thus treated is not subjected to a quick and uniform application of cold. After cooling, the cocoa is removed by shovels from the tables and placed in sieves (either revolving or flat sieves) operating to screen the cocoa and separate the fine from the coarse.

As recited above, the sieving completes the operation, but a very small portion of the cocoa is sufficiently pulverized to pass through the screen, ordinarily not more than ten to twenty per cent. That portion of the cocoa that will not pass through the screen, or the tailings, so called, is carried back and again subjected to the same process of treatment. This means a very slow and laborious process, for even in the case of the cocoa which will first pass through the screen the process of treatment takes fully an hour. During all this time the cocoa will be exposed to unsanitary conditions owing to its fineness and more or less of the fine cocoa will be taken up by the air and blown about, causing great waste.

These being some of the prevailing conditions, it is among the objects of my invention to provide a process of treatment which is essentially hygienic; to prevent waste; to provide whereby the color of the cocoa after the heating thereof may be preserved by a quick and uniform application of cold; to provide whereby the cocoa may be reduced to a fineness hitherto unattained, and to provide, also, whereby the treatment of the cocoa may be accomplished in a very short interval of time, and this essentially for the reason that the cooling of the cocoa takes but a few seconds and the cocoa is rendered about 90% fine, leaving only about 10% tailings for any batch of cocoa and these tailings very fine, or of sufficient fineness for certain grades of cocoa.

The present process consists in first breaking up the cake cocoa as finely as possible and uniformly heating it at such temperature as will impart proper color to it.

The breaking up of the cocoa may be effected by any of the common forms of machine suitable for such purpose.

The heating of the cocoa may be effected in any suitable manner. In practice it is heated in the breaking up machine partly by the breaking up of the cocoa and partly by the application of artificial heat, the breaking up machine being steam-jacketed. I prefer that the cocoa be heated to a temperature of from 120° F. to 135° F. If the cake cocoa is cold I prefer the higher temperature; if warm, right from the press, after the extraction of the oil, the lower temperature.

In practice the cocoa is kept in the breaking up machine subject to the influence of heat from twenty to thirty minutes depending upon the degree of color desired to be obtained, this step of course admitting of considerable variation. The breaking up machine need not necessarily be located in a hot room although it is better to maintain an ordinary temperature of from 70° to 80°

F. After the heating and inparting of color to the cocoa, it is quickly and uniformly cooled by the taking up and suspension of segregated particles thereof in cool air preferably at a temperature of about 40° to 45° F., passed through a pipe or pipes, and which operates to set the color, keep the cocoa from unsanitary influences and convey it to a suitable depository or place of collection. The taking up, segregation, suspension and carrying of the particles of cocoa in cool air are first effected by suction or draft induced in a pipe the mouth of which is in close proximity to the cocoa in the breaking up machine, the fine particles of cocoa being sucked up to pass through this pipe. As will later be explained, the air into which the cocoa is first taken up is not necessarily the cooling air of the lower temperature above referred to, nor a hot air. In practice it is simply the air of the room in which the breaking up machine is contained slightly raised in temperature as it passes in over the breaking up machine to enter the mouth of the pipe. The particles of cocoa are, however, almost instantly suspended in the lower or proper cooling temperature as above referred to, contained in pipe sections beyond the primary section into which the cocoa is first introduced and which lower temperature of air operates to set the color.

The initial taking up and suspension of the particles of cocoa in air of a normal temperature has its advantage in the fact that the air is cool enough to slightly congeal the particles of cocoa so that any particles that may adhere to one another will become broken up by their passage through the primary pipe section and associated parts and when the cocoa reaches the cool air the particles will have become segregated and will accordingly each become subject to a quick and uniform application of cold air.

Apart from imparting color to the cocoa, the process described above performs also the function of reducing the cocoa to a remarkable degree of fineness, practically all of the cocoa passing through the pipes becoming so reduced that very little remains unrefined and that of a degree of fineness suitable for certain grades of cocoa. Such refining of the cocoa is effected especially during the passage of the cocoa through the cold air pipes, and is effected by the particles of cocoa rubbing against each other in their passage through the pipes, suspended as they are in the air passing therethrough and by their rubbing against the walls of the pipes or other interior parts; and by their passage, also, through fans for inducing draft in the pipes, all of which has an attritive action. This is especially effective during the passage of the cocoa through the cold air pipes by reason of the fact that the cold air acts to congeal or harden the oily particles of cocoa, by virtue of which they become much more easily broken up and refined by the attritive action as aforesaid.

After the cooling and refining of the cocoa the fine is separated from the coarse by sieving and this may be accomplished in the usual manner or any other manner suitable for the purpose. I have found in practice, however, that before sieving, the cocoa should be spread out upon a table and preferably gently manipulated with a hoe or rake from twenty to thirty minutes, for unless this is done it is extremely difficult to accomplish the sieving operation. The reason I ascribe for this is the presence of air between the particles of cocoa and its extreme fineness which renders the same so fluffy that sieving can only be accomplished with difficulty. The trouble may be an electrical one due to production in the mass cocoa of a static electrical charge. At any rate it is overcome in the manner above explained. By allowing the cocoa to settle and the manipulation thereof as aforesaid it can readily be passed through sieves, and it is about 90% fine, leaving only about 10% of tailings.

The process can best be seen and understood and in further detail in the light of the apparatus hereinafter to be described, and in which—Figures 1 and 1ª are a diagrammatic elevation of the apparatus, and Fig. 2 is a plan of a portion thereof to which special reference will hereinafter be made.

Referring to the drawings: 1 and 2 represent respectively separate compartments or rooms of a building, in which the process is carried on. Of these compartments 1 is a compartment in which a normal temperature may be and preferably is maintained. It will be referred to as the breaker room for in it the cake cocoa is initially broken up. Compartment 2 will hereinafter be referred to as the cold room for the air in this room is maintained at a normal temperature of from 40° F. to 45° F.

In the room or compartment 1 are located the breaking up machines 3, 4 and 5 for breaking up the cake cocoa. These machines may be of the ordinary steam-jacketed type and operate not only to break up the cake cocoa but also to heat the cocoa for imparting color to it as before explained. In practice I prefer to employ three breaking up machines, 3, 4 and 5.

Coöperating with one of the breaker machines, for instance, the breaker machine 4, is a pipe section 6 one end of which extends into the chamber of the machine in close proximity to the cocoa mass therein. The other end of this pipe connects with the inlet of a fan 7. At times it may be desirable to move the mouth of the pipe 6 out of the chamber of the breaker 4 and for this purpose the end section 8 of the pipe is preferably made telescopic with relation to the main body thereof, any suitable means 9 being employed for manually moving this section.

Extending from the outlet of the fan 7 is a pipe 10 which enters tangentially the upper part of a centrifugal dust-settling chamber or hopper 11 having a top 12 (see Fig. 2) and a converging body terminating in a bottom end 13. Through the top 12 of the hopper there enters a pipe 14 terminating at 15 below the level of the pipe 10. The pipe 14 has some considerable extension and connects with the side of an auxiliary hopper 16. This hopper is shaped substantially like the hopper 11. Depending from the top of the hopper 16 around an opening therein is a short pipe section 17 the bottom open end of which lies within the chamber of the hopper below the point where the pipe 14 connects with the side thereof. The upper end of the pipe 17, is open to the atmosphere. Extending from the bottom end of the hopper 16 is a discharge pipe 18 which empties into a receptacle or box 19 for receiving the contents of the hopper. All of the parts thus far described are located in the compartment 1.

Connecting with the bottom end 13 of the hopper 11 is a pipe 20. This pipe extends from the warm room into the cold room and is preferably vertically arranged. The lower open end 21 of this pipe terminates just short of an open hopper 22. In other words, the hopper 22 is open for receiving the contents of the pipe 20 and also cold air from the cold air room in which it is located. This hopper connects by a pipe section 23 with the inlet of a fan 24. Extending from the outlet of this fan is a pipe section 25 which connects with the side of a hopper 26. This hopper is made substantially like the hopper 11 and the pipe 25 connects with it at a point adjacent the top of the hopper a little offset from the vertical center thereof substantially in the same manner as the pipe 10 connects with the hopper 11 as above explained. At the bottom end of the body thereof the hopper 26 is provided with an outlet pipe 27. Extending from within the chamber of the hopper 26 through the top 28 thereof is a pipe 29. The open bottom end of this pipe is located well down within the chamber of the hopper below the point where the pipe 25 connects therewith and the pipe extends to connect with an auxiliary hopper 31 having a discharge pipe 32 which empties into a receptacle or box 33 arranged beneath it. Extending from within this auxiliary hopper through the top 34 thereof is a pipe 35 which connects with a settling chamber 36.

Arranged below the outlet pipe 27 of the hopper 26 is an open-mouthed hopper 37 for receiving its contents. This hopper 37 is open to the atmosphere of the cold room and it connects by a pipe section 38 with the inlet of a fan 39. Connecting with this fan to extend from the outlet thereof is a pipe section 40 which connects with the side of a hopper 41. This hopper is substantially like the hopper 26 and the pipe 40 connects with it at a point adjacent the top of the hopper and offset from the vertical center thereof in the same manner as before. At its bottom end thereof the hopper 41 is provided with an outlet or discharge pipe 42. Extending from within the chamber of the hopper 41 through the top 43 thereof is a pipe section 44 which connects with an auxiliary hopper 45 having a discharge pipe 46 which empties into a receptacle or box 47 arranged below it. Extending from within the chamber of the auxiliary hopper 45 through the top 48 thereof is a pipe 49 which connects with the settling chamber 36.

Arranged below the outlet pipe 42 of the hopper 41 is an open-mouthed hopper 50. This hopper 50 is open to the atmosphere of the cold room. It connects by a pipe section 51 with the inlet of a fan 52. Connecting with the outlet of this fan is a pipe 54 which connects with the side of a hopper 55. The pipe 54 connects therewith at a point adjacent the top of the hopper and tangentially to the vertical center thereof the same as before. At the bottom end thereof the hopper 55 has a discharge pipe 56 and arranged below this pipe is a receptacle or box 57 in which the contents of the hopper are deposited. Extending from within the chamber of the hopper 55 through the top 58 thereof is a pipe 59 which connects with the side of an auxiliary hopper 60. This hopper has a discharge pipe 61 below which is a receptacle or box 62 for receiving the contents of the hopper. Extending from within the chamber of the hopper 60 through the top 63 thereof is a pipe 64 which connects with the settling chamber 36.

The operation of the apparatus is as follows:—The cake cocoa is broken up and a proper color imparted to it in the steam-jacketed breaking up machines 3, 4 and 5. Of course but one of these machines, or machine 4 with which the pipe 6 coöperates, might be used at a given time. For the purpose of keeping the process as continuous as possible, however, the two auxiliary machines 3 and 5 are employed as feeders for machine 4. In other words, the cake cocoa is initially broken up in machines 3 and 5 and a proper color imparted to it in these machines. The cocoa is then taken out of the machines 3 and 5 and placed in machine 4 where the color is maintained, and from which the cocoa is drawn out in the following manner: As explained above, the pipe 6 or extensible end 8 thereof extends into the chamber of the machine 4 in close proximity to the broken cocoa therein. The operation of the fan 7 develops a suction in the pipe 6, drawing in air and fine particles of cocoa with it, which pass through the pipe 6 suspended in the air, thence through the chamber of the fan 7 and thence through the pipe 10 into the hopper 11, the fan 7 operating to propel the air and particles of cocoa therein into the chamber of the hopper. Owing to the manner in which the pipe 10 connects with this hopper a cyclonic action is developed within the hopper. In other words, the air and cocoa swirl around within the chamber of the hopper with the resulting effect of reducing or getting rid of the air pressure developed by the fan 7 and enabling the particles of cocoa to pass out of the hopper down through the pipe 20 in a gently-flowing current of air. This is due to the cyclonic action developed within the hopper 11, the tendency of the particles of cocoa being to course along the interior wall of the hopper leaving the air relatively clarified within, the pressure being eliminated by the passage of such air outwardly through the pipe 14 into the hopper 16 where a similar cyclonic action again takes place. Very little cocoa dust will pass over through the pipe 14 into the hopper 16 and the air will become substantially clarified from such dust in the hopper 16, the cocoa dust or powder passing out of the hopper into the receptacle or box 19 and surplus air through the pipe 17 to the atmosphere. In practice the air passing out through the pipe 17 to the atmosphere is free from the cocoa dust.

The main body of cocoa sucked up and propelled by the fan 7 through the hopper 11 and pipe 20 as above explained, passes downwardly through the pipe 20 and into the hopper 22, the same being sucked into the hopper by the action of the fan 24 through the pipe section 23. The fan 24 also operates to draw in the cold air from compartment 2 and the cocoa dust here receives its first application of cold for setting its color. When the particles receive this initial application of cold they have been separated so that each particle receives its individual application of cold. Thus the application of cold is an even application to the particles of cocoa contained in the air. This is due to the fact that any particles or pieces which may have had a tendency to cling together as they are drawn up from the breaking up machine have been separated or broken up by their passage through the previous connections, especially by their passage through the fan 7. Such segregation of the particles of cocoa before the initial application of cold is made more effective by reason of the fact that the air drawn into the pipe 6 with the particles of cocoa sucked out of the breaker 4, is air having substantially the temperature of room 1 and is accordingly slightly cooler than the cocoa itself. This cooler air tends to slightly congeal the particles of cocoa and assist in their becoming separated as aforesaid.

From the hopper 22 the cold draft of air and particles of cocoa carried therein from the pipe 20 are drawn to pass through the pipe 23 and fan 24 and thence propelled by the fan through the pipe 25 into the hopper 26 where a cyclonic action takes place with substantially the same effect as in the hopper 11. In other words, the particles of cocoa introduced into the hopper 26 tend to pass out through the outlet 27 thereof in a gently-flowing current of air, while the excess air or pressure is eliminated by way of the pipe 29 which connects with the auxiliary hopper 31. Very little cocoa dust will pass over with the air through the pipe 29 and this dust becomes practically freed from the air in the auxiliary hopper 31 where a similar cyclonic action takes place although in a modified way, the freed particles of cocoa passing out of the hopper into the receptacle or box 33, while the excess air with any very fine particles in it passes out by way of the pipe 35 into the settling chamber 36 which is simply a closed chamber in which the dust settles. The main body of cocoa passing out of the hopper 26 now receives a second bath of cold air in its passage from the hopper 26 into the hopper 37. The particles of cocoa and cold air with them from the compartment 2 are drawn into this hopper to pass through the pipe 38 by the suction of a fan 39 which operates also to compel the cold air and particles of cocoa therein through the pipe 40 into the hopper 41.

The subsequent operation is substantially the same as before. A cyclonic action is developed within the hopper 41 and the main body of cocoa introduced into this hopper passes out through its outlet pipe 42, while the pressure of air within the hopper is relieved through the pipe 44. Any cocoa passing over through the pipe 44 is directed into the auxiliary hopper 45 where a further separation takes place, some of the cocoa passing into the box or receptacle 47, while the excess of air and any fine particles of cocoa in it passes over through the pipe 49 into the settling chamber. The cocoa passing out of the hopper 41 now receives its third bath of cold air by passing into the hopper 50, the cocoa and cold air being drawn therein by the fan 52 and thence propelled by this fan through the pipe 54 into the hopper 55. The cyclonic action developed within this hopper tends to effect a separation of the cocoa, and the main body of cocoa passes out of the hopper into the receptacle or box 57 while the excess air and fine particles of cocoa therein are relieved by way of the pipe 59 which connects with the auxiliary hopper 60. In this hopper separation takes place as before and a portion of the cocoa therein passes out by way of the discharge pipe 61 into the receptacle or box 62 while the excess air and any fine particles of cocoa that may be carried in it pass over by way of the pipe 64 into the settling chamber 36. The main body of cocoa thus treated will be found in the receptacle or box 57 and the cocoa within this box and also any that may be found in the box 62 is ready for sieving.

Cocoa left in the boxes 19, 33 and 47 may be returned to the breaker machines and again processed if unsuitable for sieving. Cocoa left in the settling chamber 36 is finely reduced and after sieving is suitable for certain grades of cocoa.

The passage of the cocoa through the pipes and fans operates on account of the attritive action to reduce the cocoa to a remarkable degree of fineness and for this purpose I prefer that the pipes should be provided with numerous turns or bends and should be of some considerable extension. In practice pipes are employed of about ten inch diameter and having a running length from the breaking up machine to where the cocoa is drawn off for sieving, of approximately 250 feet. I also employ in practice eighteen inch high speed fans for inducing the draft within the pipes.

While there are shown three openings for cold air into the pipe system, a less or greater number may be employed as may be found necessary. It is also obvious that the process and apparatus employed together with the arrangement thereof may be varied in considerable detail depending upon the circumstances under which it is used and still be within the spirit of my invention.

The apparatus shown and described in this application is not claimed herein, since said apparatus is covered in the claims of my copending application, Serial No. 47,593, filed August 27, 1915.

Having thus fully described my invention, I claim and desire to secure by Letters Patent of the United States:—

1. The process of treating cocoa which comprises breaking up and heating the cocoa cake and afterward chilling the broken cocoa by suspension of the heated particles thereof in cold air.

2. The process of treating cocoa which comprises breaking up and heating the cocoa cake and afterward chilling the broken cocoa by the suspension and conveyance of the heated particles thereof in a current of cold air.

3. The process of treating cocoa which comprises breaking up and heating the cocoa cake and afterward chilling the broken cocoa by the suspension and conveyance of the heated particles thereof in cold air induced to pass through a pipe.

4. The process of treating cocoa which comprises breaking up and heating the cocoa cake and afterward chilling the broken cocoa by the suspension and conveyance of the heated particles thereof in successive currents of cold air.

5. The process of treating cocoa which comprises breaking up and heating the cocoa cake and afterward chilling the broken cocoa by subjecting the heated particles thereof to successive blasts of cold air induced to pass through pipes.

6. The process of treating cocoa which comprises breaking up and heating the cocoa cake, segregating the heated particles thereof and afterward chilling the same by suspension of said particles in cold air.

7. The process of treating cocoa which comprises breaking up and heating the cocoa cake, segregating the particles thereof by suspension in air and chilling the particles while in suspension by an application of cold air thereto.

8. The process of treating cocoa which comprises breaking up and heating the cocoa cake, segregating the heated particles thereof by the taking up and suspension of said particles in a current of air passed through a pipe and afterward chilling said particles of cocoa by the suspension and conveyance thereof in cold air passed through a pipe.

9. The process of treating cocoa which comprises breaking up and heating the cocoa cake, segregating the heated particles of cocoa by the taking up and suspension thereof in air passed through a pipe and afterward chilling said particles of cocoa by the suspension and conveyance of said particles in successive currents of cold air passed through pipes.

10. In the process of treating cocoa, the steps of quickly and uniformly cooling heated particles of cocoa cake which comprises the segregation of said particles by suspension thereof in air passed through a pipe and the subsequent cooling of said particles in cold air passed through a pipe.

11. In the process of treating cocoa, the step of quickly and uniformly cooling heated particles of cake cocoa by suspension of said particles in cold air.

12. In the process of treating cocoa, the step of quickly and uniformly cooling heated particles of cake cocoa by the conveyance and suspension of said particles in cold air induced to pass through a pipe.

13. In the process of treating cocoa, the step of quickly and uniformly cooling heated particles of cake cocoa by the suspension and conveyance of said particles in successive currents of cold air passed through pipes.

14. In the process of treating cocoa for making cocoa powder, the steps comprising cooling particles of cake cocoa and subjecting said particles while cold to attritive action induced by agitating said particles and causing the same to engage contacting surfaces while suspended in air.

15. In the process of treating cocoa for making cocoa powder, the steps comprising cooling particles of cake cocoa and subjecting said particles while cold to attritive action induced by the conveyance of said particles against contacting surfaces while suspended in air.

16. In the process of treating cocoa for making cocoa powder, the steps comprising cooling particles of cake cocoa and subjecting said particles while cold to attritive action induced by conveyance of said particles in a draft of air made to pass through a bent pipe.

17. In the process of treating cocoa for making cocoa powder, the steps comprising cooling particles of cake cocoa and subjecting said particles while cold to attritive action induced by the conveying of said particles through a fan and the throwing of said particles thereby against contacting surfaces.

18. In the process of treating cocoa for making cocoa powder, the step of reducing cake cocoa to a powder which comprises subjecting particles thereof to attritive action induced by agitating said particles and causing the same to engage contacting surfaces while suspended in air.

19. In the process of treating cocoa for making cocoa powder, the step of reducing cake cocoa to a powder which comprises subjecting said particles to attritive action induced by the conveyance of said particles against contacting surfaces while suspended in air.

20. In the process of treating cocoa for making cocoa powder, the step of reducing cake cocoa to a powder which comprises subjecting said particles to attritive action induced by conveyance of said particles in a draft of air made to pass through a bent pipe.

21. In the process of treating cocoa for making cocoa powder, the step of reducing cake cocoa to a powder which comprises subjecting said particles to attritive action induced by the conveying of said particles through a fan and the throwing of said particles thereby against contacting surfaces.

22. The process of treating cocoa for making cocoa powder which comprises breaking up cake cocoa and heating it for imparting proper color thereto, and then setting the color and subjecting the broken particles of cocoa to a further attritive action by the chilling of the particles through suspension thereof in cold air passed through a pipe or pipes presenting surfaces against which the particles are adapted to come into contact during the passage thereof.

23. A process of treating cocoa which comprises crushing the cocoa cake and heating the same sufficiently to produce the desired color therein, and thereafter suddenly and uniformly cooling the colored crushed cocoa to set the color.

24. A process of treating cocoa which comprises crushing the cocoa and heating the same sufficiently to produce the desired color, and afterward chilling the crushed cocoa, by treating the same with a cold gas.

25. A process of treating cocoa which comprises crushing the same and heating sufficiently to produce the desired color therein, and afterward chilling the crushed cocoa by suspending the same in a moving current of a cold gas.

JOHN WALKER.

Witnesses:
JOHN E. R. HAYES,
M. E. FLAHERTY.